United States Patent [19]

Toyoda et al.

[11] 4,418,112

[45] Nov. 29, 1983

[54] COMPOSITE FILM AND UTILIZATION THEREOF

[75] Inventors: Takashi Toyoda; Yozo Ohba; Masaaki Yamanaka, all of Hasaki, Japan

[73] Assignee: Oji Yuka Goseishi Kabushiki Kaisha, Tokyo, Japan

[21] Appl. No.: 300,976

[22] Filed: Sep. 9, 1981

[30] Foreign Application Priority Data

Sep. 16, 1980 [JP] Japan .................... 55-128350

[51] Int. Cl.³ .................. B32B 7/02; B32B 5/16
[52] U.S. Cl. .................. 428/212; 428/323; 428/327; 428/328; 428/331; 428/336; 428/409; 428/516; 428/910; 430/155
[58] Field of Search ........... 428/327, 323, 516, 910, 428/331, 212, 328, 336, 409; 156/229; 430/155

[56] References Cited

U.S. PATENT DOCUMENTS

| | | | |
|---|---|---|---|
| 3,799,828 | 3/1974 | Takashi et al. | 156/229 |
| 4,101,050 | 7/1978 | Buckler et al. | 428/516 X |
| 4,259,412 | 3/1981 | Buzio et al. | 428/516 |
| 4,303,708 | 12/1981 | Gebhardt et al. | 428/516 X |
| 4,318,950 | 3/1982 | Takashi et al. | 428/910 X |
| 4,339,504 | 7/1982 | Luebbe, Jr. et al. | 428/516 X |

*Primary Examiner*—Thomas J. Herbert, Jr.
*Attorney, Agent, or Firm*—Wenderoth, Lind & Ponack

[57] ABSTRACT

A composite film comprising a first layer comprising a polyolefin resin containing finely divided calcium carbonate dispersed therein and a surface layer comprising a polyolefin resin containing an acidic filler dispersed therein, which surface layer is bonded directly or indirectly to at least one surface of the first layer and has a thickness of at least 3 microns. A diazo copying paper is also disclosed which has a photosensitive diazo layer on the surface layer of the composite film.

3 Claims, No Drawings

COMPOSITE FILM AND UTILIZATION THEREOF

BACKGROUND OF THE INVENTION

Technical Field

The present invention relates to a composite film and to its uses. More particularly, the present invention relates to a composite film composed of a polyolefin resin and a diazo copying paper in which the nature of the composite film is fully utilized.

Heretofore, as support sheets or substrates of so-called diazo copying papers coated with a photosensitive diazo compound, pulp papers made from wood pulp as base materials and thermoplastic stretched or oriented films, the surfaces of which have been physically or chemically treated are being used in large quantities. Among these support sheets, pulp paper is unsuitable for use in applications wherein strength, durability and dimensional stability are required. Therefore, as a support sheet for a secondary original drawing paper or copying papers for drawings which are used outdoors, a polyester oriented film is used for the purpose of satisfying the above mentioned requirements. However, a support sheet consisting of a polyester oriented film exhibits poorer writability and erasability and is more expensive, as compared with a pulp paper. Therefore, a polyester support sheet is not always satisfactory.

Oriented films made from thermoplastic resins with finely divided inorganic fillers incorporated thereinto are also known. A polyolefin oriented film containing clay is used as a support sheet for diazo copying papers.

Thermoplastic resin films containing inorganic fillers have excellent writability, erasability, stiffness, feel, optical properties (e.g. hue, whiteness, luster, opaqueness), dimensional stability and durability, and thus is suitable for use as a support sheet for a diazo copying paper. Particularly, when calcium carbonate is used as the filler, the resulting thermoplastic resin film exhibits a high degree of whiteness and excellent light resistance, results in decreased wear of machines used for cutting, printing, etc., and is inexpensive. A monolayer film or multi-layer film made from a polyolefin resin containing calcium carbonate has excellent properties as paper and thus is considered to be useful as a support sheet for a diazo copying paper. Calcium carbonate possesses an excellent covering property and is capable of promoting ink drying and may also be used as a useful filler for general-purpose synthetic papers.

As a result of our various studies, however, we have found that when a calcium carbonate-filled polyolefin resin film is used as the support sheet for a diazo copying paper, the diazo compound undergoes denaturation during storage of the paper, which results in fogging in which the portion of the paper to be originally whitened becomes colored upon being developed. Particularly, when the copying paper is stored under high temperature and humidity, this phenomenon becomes pronounced.

Results of our investigations indicated that the fogging is ascribable to the fact that the calcium carbonate-filled polyolefin resin film is basic or alkaline in nature. That is, the photosensitive diazo paper undergoes development of a color due to a coupling reaction under alkaline conditions. The calcium carbonate-filled polyolefin resin film has a pH of from about 9 to 10, measured by immersing 1 g of fine pieces of the film in 75 ml of distilled water at a temperature of 20° C., stirring the mixture for about one hour, and determining the pH of the aqueous phase. This pH level is high enough to cause the fogging of the photosensitive diazo compound.

As an approach to preventing the fogging due to the calcium carbonate filler, mention may be made of the application of an acidic liquid on the film surface, the incorporation of a large amount of an acidic component into the photosensitive diazo compound, and lamination of a resin film on the film.

However, application or incorporation of an acidic material causes the development time of the diazo paper to be extended and, thus, is impracticable. On the other hand, when lamination is attempted, if a film made from a non-polar resin is laminated with a sufficient thickness on the film so as to isolate the calcium carbonate from the photosensitive diazo compound, the development of fogging may be completely prevented. However, the above mentioned preferable surface properties (writability, erasability, adhesion to the diazo photosensitive layer, etc.) are undesirably lost.

SUMMARY OF THE INVENTION

The present invention aims to overcome the above described problem and to prevent the development of fogging in the composite film while the advantages, such as whiteness, wear resistance and writability, inherent in the calcium carbonate filler, are retained therein. The present invention contemplates attaining this object by a composite film provided with an acidic filler-filled film on the surface thereof.

Accordingly, the composite film according to the present invention comprises a first layer comprising a polyolefin resin containing finely divided calcium carbonate dispersed therein and a surface layer comprising a polyolefin resin containing an acidic filler dispersed therein, which surface layer is bonded directly or indirectly to at least one surface of the first layer and has a thickness of at least 3 microns.

The diazo copying paper according to the present invention comprises a composite film and a photosensitive diazo layer formed on the surface of the composite film, which composite film comprises a biaxially-oriented backing film made from a polyolefin resin containing finely divided calcium carbonate dispersed therein in a quantity of from 0 to 45 parts by weights per 100 parts by weight of the polyolefin resin, an interlayer made from a polyolefin resin containing finely divided calcium carbonate dispersed therein in a quantity of from 10 to 200 parts by weight per 100 parts by weight of the polyolefin resin, the interlayer being formed on at least one surface of the backing film, and a uniaxially oriented surface layer made from a polyolefin resin containing a finely divided acidic filler in a quantity of from 20 to 300 parts by weight per 100 parts by weight of the polyolefin resin, which surface layer is formed on the surface of the interlayer.

In the composite film of the present invention, the surface layer comprises a polyolefin resin containing an acidic filler and is relatively thin. Therefore, the composite film not only retains substantially the above mentioned properties possessed by the polyolefin resin containing calcium carbonate, but also exhibits almost the same writability and erasability as those of the polyolefin resin containing calcium carbonate because of the surface property of the surface layer itself.

In spite of the fact that the surface layer of the composite film according to this invention is acidic, the composite film affords a diazo copying paper having almost the same development time as that of a diazo copying paper whose support sheet has no acid layer. In view of the prolonged development time in the case of the application or incorporation of the acidic material as described hereinabove, the behavior of the acidic filler in the composite film of the present invention can be said to be unique.

DETAILED DESCRIPTION OF THE INVENTION

1. Composite film (1) Laminated structure

The composite film according to the present invention has a laminated structure or laminate comprising a layer (B) comprising a polyolefin resin containing finely divided calcium carbonate dispersed therein and a surface layer (C) comprising a polyolefin resin containing an acidic filler dispersed therein which is formed directly or indirectly on at least one surface of the layer (B).

As is apparent from this definition, the laminate comprises at least two layers ((B)-(C)). It is preferable that the laminate be of a three layer structure ((C)-(B)-(C)) in which the acidic filler-containing surface layer (C) is formed on both surfaces of the layer (B). This is because photosensitized papers are usually stored in such a condition that a plurality of papers are in contact with each other.

The more preferable laminate is of a structure ((A)-(B)-(C)) in which the above mentioned layer (B) is formed on at least one surface of a backing layer (A) comprising a polyolefin resin containing a small quantity (about from 3 to 40% by weight) of calcium carbonate, and the above mentioned layer (C) is further formed on the layer (B).

The most preferable laminate is of a structure (C)-(B)-(A)-(B)-(C).

In the laminated structure as described above, the backing layer (A) is preferably biaxially oriented, the layer (B) is preferably uniaxially or biaxially oriented and the layer (C) is preferably uniaxially oriented. When a resin film containing a finely divided filler dispersed therein is an oriented film, the film has a plurality of fine voids around the filler particles. These fine voids cause the film to have a whiteness and a paper-like feel. (In the case of a composite film, the properties of all films contribute collectively to the whiteness and paper-like feel of the composite film.) In the case where the surface layer is a uniaxially oriented layer, the surface of the surface layer also has surface cracks around the filler particles. These surface cracks cause an offset printing ink and a photosensitive diazo compound to be easily absorbed into and firmly bonded to the surface layer.

(2) Composition of each layer (1) Layer (B)

The layer (B) comprises a polyolefin resin containing finely divided calcium carbonate dispersed therein. The description "comprises a polyolefin resin containing finely divided calcium carbonate dispersed therein" is intended to mean that in addition to these two essential components, a small quantities of another filler or compatible thermoplastic resin may be included, and various additives conventionally usable for thermoplastic resin compositions, such as anti-oxidant, lubricant, pigment, and the like, may be included.

The term "polyolefin resin" as used herein refers to homopolymers and copolymers of an α-olefin such as ethylene, propylene or butene-1 and copolymers of an α-olefin and a small quantities of another ethylenically unsaturated monomer copolymerizable with the α-olefin. In consideration of the application of the composite film as paper, it is preferable that these polymers be substantially crystalline polyolefin resins. The preferable polyolefin resins which may be used in the present invention are low to high density polyethylene, isotactic polypropylene, crystalline ethylene-propylene copolymers, crystalline ethylene-propylene-butene-1 copolymers, crystalline propylene-butene-1 copolymers and the like.

Calcium carbonate is a compound known as a filler for resins. In the present invention, any type of calcium carbonate for a filler may be used. The calcium carbonate should be of fine particles having an average particle size of, for example, from 0.01 to 15 microns, preferably 5 microns or less.

It is preferable that the layer (B) contain calcium carbonate in an amount such that it will exhibit the above mentioned advantages due to the calcium carbonate to a satisfactory extent. By way of example, the layer (B) contains calcium carbonate in a quantity of from 10 to 200 parts by weight, preferably from 10 to 100 parts by weight, per 100 parts by weight of the polyolefin resin.

(2) Layer (C)

The layer (C) is substantially the same as the layer (B) except that the filler is an acidic filler.

Acidic fillers usable for the present invention include clay, titanium oxides, talc, other acidic oxides, and calcium carbonate the surface of which is treated with phosphoric acid or stearic acid. It is preferable that the acidic fillers are of fine particles having an average particle size of from 0.01 to 15 microns, particularly, 5 microns or less.

(3) Layer (A)

The layer comprising a polyolefin resin containing no calcium carbonate filler or a small amount thereof which is used in the preferred embodiment of the composite film according to the present invention is substantially the same as the layer (B) except for a point concerning the amount of the filler.

The layer (A) usually is biaxially oriented. Therefore, the content of the filler should be limited to a level adequate for biaxial orientation. That is, when the content of the filler is too low, the tensile strength of the composition is disadvantageously high during the stretching procedure. Also, if the filler content is too high, the composition cannot be stretched stably. Therefore, the content of the calcium carbonate is suitable from 0 to 45 parts by weight, preferably from 3 to 40 parts by weight, per 100 parts by weight of the polyolefin resin.

(3) Thickness of each layer

The thickness of each layer may be very important as long as the desired effects of the present invention can be attained. The layer (A), if used, is usually a biaxially oriented film and serves to impart satisfactory strength and isotropy to the composite film. Therefore, the thickness of the layer (A) is usually determined from this point of view. Generally, the thickness of the layer (A) is $\frac{1}{4}$ to $\frac{3}{4}$ of that of the composite film.

The layer (B) usually is biaxially oriented film in the case where the composite film is of a two layer structure and a monoaxially or biaxially oriented film in the case where the composite film is of a structure of three or more layers. The layer (B) serves to impart the effects of the calcium carbonate contained therein to the composite film. Therefore, the thickness of the layer (B) is usually determined from these points of view. Generally, the thickness of the layer (B) is ¼ to ¾ of that of the composite film in the case of a composite film of two layers, and 3 to 25 microns in the case of a composite film of three or more layers.

The layer (C) is a surface layer which serves to prevent the alkali-sensitive material (e.g., photosensitive diazo compound) to contact the surface layer from being influenced by the alkaline layer (B) and to cause the composite film to retain the characteristics inherent in the layer (B) to a satisfactory extent. Therefore, the thickness of the layer (C) is usually determined from these points of view. Generally, the thickness of the layer (C) (total thickness in the case of the layers (C) on both surfaces of the composite film) is preferably ⅓ or less of the thickness of the layer (A)+(B). Also, it is preferable that the thickness of each layer (C) be 3 microns or more, and 15 microns or less from the standpoint of cutting.

(4) Production of the composite film

The composite film of the present invention can be produced by any method provided that the desired effects of the present invention can be thereby attained. The preferred method is a combination of an extrusion laminating method and stretching.

Specifically, in the case of the above mentioned five layer structure (C)-(B)-(A)-(B)-(C), a sheet to constitute the layer (A) is first formed by melt extrusion and is stretched at a stretch ratio of from 2 to 8 in a uniaxial direction, e.g., in a longitudinal or machine direction (MD). Then, sheets to constitute the layer (B) is melt extruded on both surfaces of the layer (A), and sheets to constitute the layers (C) are melt extruded on the outer surfaces of the layers (B), whereby a laminate is obtained. The layers (B) and (C) may be extruded simultaneously or stepwisely. The resulting laminate is then stretched at a stretch ratio of from 3 to 10 in a direction perpendicular to the above mentioned stretching direction, i.e., a transverse direction (TD). After the stretching, the laminate is cooled while the stretched condition thereof is maintained and, if necessary, is subjected to after treatments such as annealing.

2. Diazo copying paper

(1) Support sheet

The diazo copying paper according to the present invention comprises a support sheet consisting of the composite film having the above described structure (A)-(B)-(C) or (C)-(B)-(A)-(B)-(C), and a photosensitive diazo layer formed on the surface layer, i.e., the layer (C), of the support sheet.

The detals of the composite film which is the support sheet for the diazo copying paper have been already described with reference to the preferable embodiment of the laminate structure. That is: the layer (A), i.e., the backing layer [the layer (A) being called the backing layer also in the case of the structure (A)-(B)-(C)] is a biaxially oriented film containing a calcium carbonate filler dispersed therein in a quantity of from 0 to 45 parts by weight, particularly from 3 to 40 parts by weight, per 100 parts by weight of the polyolefin resin; the layer (B), i.e., the interlayer, is a uniaxially oriented film containing a calcium carbonate filler dispersed therein in a quantity of from 10 to 200 parts by weight, particularly from 10 to 100 parts by weight, per 100 parts by weight of the polyolefin resin; and the layer (C), i.e., the surface layer, is a uniaxially oriented film containing an acidic filler dispersed therein in a quantity of from 20 to 300 parts by weight, particularly from 50 to 200 parts by weight, per 100 parts by weight of the polyolefin resin.

From the standpoint of excluding the influence of the calcium carbonate filler on the photosensitive diazo layer, it is desirable that the surface layer (C) have a preferable thickness as prescribed hereinabove.

Specifically, when the acidic filler is calcined clay, for example, it is suitable that the surface layer have a thickness such that when the surface of the composite film is irradiated with electron beams under conditions comprising an accelerating voltage of 20 KV and a sample current of 0.05 μA by using an X-ray microanalyzer "EMX-SM" (model designation, manufactured by Shimadzu Corporation, Japan), the intensity ratio of Kα(Si) and Kα(Ca) generated from the film surface, i.e. Kα(Ca)/Kα(Si), is 5 or less, preferably 2 or less.

(2) Photosensitive diazo layer

The diazo copying paper according to the present invention is substantially the same as a conventional diazo copying paper, except that the support sheet consists of the above mentioned composite film. Therefore, the type of the photosensitive diazo compound to be used and the mode of its use, the type as paper for diazo copying and the mode of its use, and other conditions may be suitably selected with reference to various known literature and documents, particularly textook references. One such reference, for example, is "insatsu Gijutsu Ippan" ("Printing Technology in General") (revised edition), pp 408–410, published by Sangyo Tosho K.K., Japan, May 10, 1968.

Reference will be made below to a few points.

The diazo copying paper according to the present invention is used as a general-purpose copying paper (both dry and wet) known as a so-called diazo copying paper. In addition, the diazo copying paper of the present invention is used as a negative-working photosensitive material or a positive-positive working photosensitive for a so-called PS plate. The photosensitive material of which the photosensitive diazo layer is composed may be selected from photosensitive diazonium salts and azide compounds. Examples of the photosensitive materials are diazonium salts such as dimethylaminobenzene-4-diazonium fluoroborate, dimethylaniline-2-methyl-4-diazonium sulfate, 2-monoethylnaphthylamine-4-diazonium chloride and diphenylamine-4-diazonium chloride; diazo resins prepared from the condensation of these diazonium salts with formaldehyde; and azide compounds such as o-quinonediazide and N-benzoyl-N'-[naphthoquinone-(1,2)-diazide-(2)-5-sulfonyl]-hydrazine. These photosensitive materials may be used singly. In addition, these photosensitive materials may be used in the form of a photosensitive diazo liquid which is prepared by mixing them with a water-soluble polyvinyl alcohol and, if necessary, by mixing the resulting mixture with an acrylic emulsion or a vinyl acetate emulsion. The photosensitive diazo liquid is effective for enhancing the adhesion of the photosensitive material to the support film. In the case where diphenylamine-4-diazonium salt is used as a photosensitive material for a PS plate, if a heteropoly acid such as phosphotungstic acid is previously applied on the surface of the composite film of the present invention, and the photosensitive diazo liquid is further applied on the acid-applied surface, the diazonium salt will combine with the heteropoly acid to form a water-insoluble sensitive layer.

3. Experimental example

In the following experimental examples, the pH was determined by the following method.

(1) Determination of the pH of the support sheet

A support sheet measuring 10 cm × 10 cm was rendered into small pieces, 1 g of which was immersed in 75 ml of distilled water for about 1 hour. Thereafter, the pH of the aqueous phase was determined.

(2) Determination of the pH of the filler 10 g of a filler was placed in 90 g of distilled water, which was then stirred at a temperature of 20° C. for about 1 hour. At the end of that time, the pH of the resulting suspension was determined.

EXAMPLE 1

(1) The following composition (A) was thoroughly mixed in a super mixer and the mixture was melted and kneaded in an extruder. Then, the melt was extruded through a die attached to the extruder at a temperature of 200° C., so as to form a sheet, which was then cooled to a temperature of 50° C. Thereafter, the sheet was heated to a temperature of about 135° C. and stretched in the longitudinal direction with a stretch ratio of about 4.

| Composition (A) | |
|---|---|
| Polypropylene "Noblene MA-6" (product name, manufactured by Mitsubishi Petrochemical Co., Ltd. | 100 parts by wt. |
| Calcium carbonate having a specific surface area of 15,000 cm$^2$/g and an average particle size of 1.5μ | 20 parts by wt. |
| "Yoshinox BHT" (anti-oxidant, manufactured by Yoshitomi Pharmaceutical Industries, Ltd. | 0.1 part by wt. |
| "Mark 329" (anti-oxidant, manufactured by Adeka Aagus K.K.) | 0.1 part by wt. |
| "Lunack" (dispersant, manufactured by Kao Soap Co., Ltd. | 0.1 part by wt. |

(2) The following compositions (B) and (C) were separately mixed in a super mixer and were separately melted and kneaded in an extruder at a temperature of 210° C. Then, the melts (B) and (C) were fed into the same die by means of conduits and these melts were superposed in the die. Then, the superposed melts were laminated on the both surfaces of the sheet obtained in (1) by the extrusion thereof through the die at a temperature of 200° C. so that the composition (C) was an outside layer of the resulting laminate.

After the laminate was solidified by cooling, it was again heated to a temperature of 160° C. and stretched in the direction perpendicular to the stretching direction in (1) with a stretch ratio of about 7. In the resulting five layered composite film, the thickness of the film (A) was 50 microns, that of the film (B) was 15 microns on each side, and that of the film (C) was 5 microns on each side. Each layer of the composite film had fine voids, and the surface of the film (C), i.e., the surface layer, had a large number of cracks.

| Composition (C) | |
|---|---|
| Polypropylene "Noblene MA-6" (manufactured by Mitsubishi Petrochemical Co., Ltd.) | 100 parts by wt. |
| Calcined clay having an average particle size of 1.2μ and a pH of 6.2 | 80 parts by wt. |
| "Yoshinox BHT" | 0.1 part by wt. |
| "Mark 329" | 0.1 part by wt. |
| "PL-113" (surfactant, manufactured by Kao Atlas K.K.) | 0.3 part by wt. |
| Composition (B) | |
| Polypropylene "Noblene MA-6" (manufactured by Mitsubishi Petrochemical Co., Ltd.) | 100 parts by wt. |
| Calcium carbonate having a specific surface area of 15,000 cm$^2$/g and an average particle size of 1.5μ | 80 parts by wt. |
| "Yoshinox BHT" | 0.1 part by wt. |
| "Mark 329" | 0.1 part by wt. |
| "Lunack" | 0.3 part by wt. |

An aqueous solution of iminpolyamide (anchor coating agent, manufactured by BASF) was applied on the surface of the composite film and dried. Then, a diphenylamine-4-diazonium salt type photosensitive diazo compound was applied on the iminpolyamide-applied surface so as to obtain a photosensitive paper. The photosensitive paper was stored in an atmosphere, at a temperature of 60° C. and a relative humidity of 80% for 3 days (corresponding to 6-month storage in an atmosphere at a temperature of 20° C. and a relative humidity of 55%), but no fogging was observed.

The document to be copied, i.e., a subject, was superposed on the surface of the photosensitive paper, which was then exposed to a chemical lamp by using a wet diazo copying machine manufactured by Ricoh Co., Ltd. When the exposed paper was developed with an alkaline solution of naphthol sulfonic acid, a clear image was obtained.

COMPARATIVE EXAMPLE 1

A film consisting of the composition (B) was laminated by extrusion on both surfaces of the center film (A) of Example 1, and the resulting laminate was stretched at a temperature of 160° C. In the three-layered laminate film thus obtained, the thickness of the film (A) was 50 microns and that of the film (B) was 20 microns on each side.

The resulting laminate film had a pH of 9.1. When a photosensitive paper prepared by coating the film with the same photosensitive diazo compound as that described in Example 1 was stored in an atmosphere at a temperature of 60° C. and a relative humidity of 80% for one day, the photosensitive paper exhibited remarkable fogging and was useless for practical purposes.

EXAMPLES 2 THROUGH 5, COMPARATIVE EXAMPLES 2 THROUGH 3 AND REFERENCE EXAMPLE

In each of these examples, a composite oriented film (three or five layers) was prepared according to the procedure described in Example 1 except that the thickness of each of the layers (A), (B) and (C) was varied as shown in Table 1.

The resulting composite film was subjected to the same diazo processing as in Example 1. When the resulting photosensitive paper was stored in a constant temperature room at a temperature of 60° C. and a relative humidity of 80% for three days, it exhibited fogging as indicated in Table 1.

TABLE 1

| Example No. | Thickness of layer film (μ) A | B | C | Thickness of composite film (μ) | pH of film | Fogging* of diazo paper | XMA Kα(Ca) / Kα(Si) | Life of film** cutting blade |
| --- | --- | --- | --- | --- | --- | --- | --- | --- |
| Comparative Example 2 | 50 | 20 | 0 | 90 | 9.2 | X | 65 | hundred thousand or more cuts |
| Comparative Example 3 | 50 | 19 | 1 | 90 | 7.8 | X | 10 | hundred thousand or more cuts |
| Example 2 | 50 | 17 | 3 | 90 | 7.5 | Δ | 5 | hundred thousand or more cuts |
| Example 3 | 50 | 15 | 5 | 90 | 7.2 | O | 2 | hundred thousand or more cuts |
| Example 4 | 50 | 10 | 10 | 90 | 7.1 | O | 0.3 | hundred thousand or more cuts |
| Example 5 | 50 | 5 | 15 | 90 | 7.1 | O | 0.05 | eighty thousand cuts |
| Reference Example | 50 | 0 | 20 | 90 | 6.8 | O | 0.01 | ten thounsand cuts |

*O : Good
Δ : Slight fogging, but useful for practical purposes.
X : Heavy fogging; useless.
**The number of the composite film cuts until the blade of the cutter became useless.

EXAMPLE 6

Composite films were prepared according to the procedure described in Example 1 except that the quantity of the calcined clay per 100 parts by weight of the polypropylene in the composition (C) was varied as shown in Table 2. The surface luster, writability, adhesion, pH and fogging of the photosensitive diazo compound of the resulting films were as shown in Table 2. When the filter quantity was less than 30 parts by weight, the photosensitive diazo liquid exhibited poor adhesion to the surface of the film, and the resulting sensitized paper was useless for practical purposes.

TABLE 2

| Test No. | Amount of filler in layer (C) | Surface luster % | pH | Writ- ability | Adhe- sion | Fogging of diazo |
| --- | --- | --- | --- | --- | --- | --- |
| 1* | 0 | 65 | 7.0 | x | x | o |
| 2* | 10 | 58 | 7.1 | Δ | Δ | o |
| 3 | 30 | 32 | 7.0 | o | o | o |
| 4 | 50 | 18 | 7.0 | o | o | o |
| 5 | 80 | 14 | 7.1 | o | o | o |
| 6 | 100 | 12 | 7.0 | o | o | o |

*Comparative Test

What is claimed is:

1. A composite film for a diazo copying paper comprising a biaxially oriented backing layer comprising a polyolefin resin containing finely divided calcium carbonate dispersed therein in a quantity of from 0 to 45 parts by weight per 100 parts by weight of the resin, an interlayer comprising a polyolefin resin containing finely divided calcium carbonate dispersed therein in a quantity of from 10 to 200 parts by weight of the resin, which interlayer is bonded to at least one surface of the backing layer, and a uniaxially oriented surface layer comprising a polyolefin resin containing a finely divided acidic filler dispersed therein in a quantity of from 20 to 300 parts by weight per 100 parts by weight of the resin, which surface layer is bonded to the surface of the interlayer and has a thickness of from 3 to 15 microns and has fine surface cracks and which surface layer is to receive thereon a photosensitive diazo layer.

2. A composite film as claimed in claim 1, wherein the finely divided acidic filler is calcined clay.

3. A composite film as claimed in claim 1, wherein the surface layer has a thickness such that when the surface of the composite film is irradiated with electron beams under conditions comprising an accelerating voltage of 20 KV and a sample current of 0.05 μA by the use of an X-ray microanalyzer, the intensity ratio of Kα(Si) and Kα(Ca) generated from the film surface, i.e., Kα(Ca)/Kα(Si), is 5 or less.

* * * * *